United States Patent [19]

Walker

[11] Patent Number: 5,366,643
[45] Date of Patent: Nov. 22, 1994

[54] METHOD AND COMPOSITION FOR ACIDIZING SUBTERRANEAN FORMATIONS

[75] Inventor: Michael L. Walker, Duncan, Okla.

[73] Assignee: Halliburton Company, Duncan, Okla.

[21] Appl. No.: 66,817

[22] Filed: May 24, 1993

Related U.S. Application Data

[63] Continuation-in-part of Ser. No. 608,877, Nov. 5, 1990, abandoned, which is a continuation of Ser. No. 258,925, Oct. 17, 1988, abandoned.

[51] Int. Cl.$^5$ .............................................. E21B 43/27
[52] U.S. Cl. ............................... 252/8.555; 252/8.553; 166/307; 166/902
[58] Field of Search .................... 252/8.555, 8.553; 166/307, 902

[56] References Cited

U.S. PATENT DOCUMENTS

| | | |
|---|---|---|
| 3,077,454 | 2/1963 | Monroe ............................ 252/392 X |
| 3,896,044 | 7/1975 | Mago et al. . |
| 3,932,296 | 1/1976 | Byth .................................. 252/392 X |
| 4,466,890 | 8/1984 | Briscoe . |
| 4,498,997 | 2/1985 | Walker ............................ 252/8.555 |
| 4,522,658 | 6/1985 | Walker . |
| 4,552,672 | 11/1985 | Walker . |
| 4,676,834 | 6/1987 | Treybig . |
| 4,734,259 | 3/1988 | Frenier et al. . |
| 5,013,483 | 5/1991 | Frenier et al. . |

*Primary Examiner*—Gary Geist
*Attorney, Agent, or Firm*—Robert A. Kent; Clifford C. Dougherty, Jr.

[57] ABSTRACT

The invention relates to a method and composition for acidizing a subterranean formation employing an acidic solution comprising hydrochloric acid solution containing a corrosion inhibitor present in a corrosion-reducing effective amount. The corrosion inhibitor comprises the product of the reaction of (i) a compound having at least one reactive hydrogen atom and having no groups reactive under the conditions of reaction other than hydrogen, (ii) a carbonyl compound having at least one hydrogen atom on the carbon atom adjacent to the carbonyl group, (iii) an aldehyde, (iv) a fatty compound and an acid source which is admixed with a source of antimony ions.

21 Claims, No Drawings

METHOD AND COMPOSITION FOR ACIDIZING SUBTERRANEAN FORMATIONS

CROSS REFERENCE TO RELATED APPLICATIONS

This is a continuation-in-part of prior copending application Ser. No. 07/608,877 filed Nov. 5, 1990, now abandoned which is a continuing application of prior copending parent application Ser. No. 258,925 filed Oct 17, 1988, now abandoned.

BACKGROUND OF THE INVENTION

1. Field of the Invention

The present invention relates to a method of acidizing a subterranean formation or well bore employing an acidic solution containing a corrosion inhibitor which substantially reduces the corrosive effects of the acidic solution on ferrous and other metals in contact with the acidic solution.

2. Prior Art

Acidizing and fracturing treatments using aqueous acidic solutions commonly are carried out in hydrocarbon-containing subterranean formations penetrated by a well bore to accomplish a number of purposes, one of which is to increase the permeability of the formation. The increase in formation permeability normally results in an increase in the recovery of hydrocarbons from the formation.

In acidizing treatments, aqueous acidic solutions are introduced into the subterranean formation under pressure so that the acidic solution flows into the pore spaces of the formation. The acidic solution reacts with acid-soluble materials contained in the formation which results in an increase in the size of the pore spaces and an increase in the permeability of the formation.

In fracture-acidizing treatments, one or more fractures are produced in the formation and the acidic solution is introduced into the fracture to etch flow channels in the fracture face. The acid also enlarges the pore spaces in the fracture face and in the formation.

The rate at which acidizing fluids react with reactive materials in the subterranean formation is a function of various factors including but not limited to acid concentration, temperature, fluid velocity and the type of reactive material encountered. Whatever the rate of reaction of the acidic solution, the solution can be introduced into the formation only a certain distance before it becomes spent. It is desirable to maintain the acidic solution in a reactive condition for as long a period of time as possible to maximize the permeability enhancement produced by the acidic solution.

A problem associated with acidizing subterranean formations is the corrosion by the acidic solution of the tubular goods in the well bore and the other equipment used to carry out the treatment. The expense of repairing or replacing corrosion damaged equipment is extremely high. The corrosion problem is exacerbated by the elevated temperatures encountered in deeper formations. The increased corrosion rate of the ferrous and other metals comprising the tubular goods and other equipment results in quantities of the acidic solution being neutralized before it ever enters the subterranean formation. The partial neutralization of the acid results in the production of quantities of metal ions which are highly undesirable in the subterranean formation.

Various methods have been proposed to decrease the corrosion problem related to acidizing treatments, however, the corrosion inhibitors employed generally are effective only at temperature levels below about 300° F. It would be desirable to provide a composition and method for acid treating a subterranean formation which overcomes at least some of the corrosion problems resulting from contact of the aqueous acidic treating solutions with ferrous and other metals.

Monroe, et al., U.S. Pat. No. 3,077,454, attempted to address the corrosion problem referred to above by using a corrosion inhibitor that did not include an acetylenic alcohol. According to Monroe, et al., acid corrosion inhibitors which do contain an acetylenic alcohol are promising but the toxicity and cost has held back their wide acceptance.

The inhibitor made by Monroe, et al., was the product of the reaction of several different compounds. However, the corrosion inhibition results obtained by using the Monroe, et al., reaction product, as disclosed by Monroe, et al., in the working examples, showed that the product was not satisfactory as an inhibitor unless it was blended with an acetylenic alcohol (such as propargyl alcohol) or a wetting agent or an acetylenic alcohol and a wetting agent. The best corrosion inhibition results obtained by Monroe, et al., involved a blend of their reaction product with an acetylenic alcohol. Thus Monroe, et al., failed to produce an effective corrosion inhibitor that does not include an acetylenic alcohol.

SUMMARY OF THE INVENTION

The present invention relates to a composition for and a method of acidizing a subterranean formation employing an acidic solution containing a corrosion inhibitor which substantially reduces the corrosive effect of the acid on ferrous metals and other alloys without reducing the effectiveness of the acidic solution in treating the subterranean formation. Neither the corrosion inhibitor nor the acidic solution employed in the invention includes an acetylenic alcohol. The acidizing solution is introduced into a subterranean formation through a well bore at a flow rate and pressure sufficient to permit the acid to dissolve formation materials or foreign material in the vicinity of the well bore.

The acidic solution comprises hydrochloric acid, alone or mixed together with one or more other acids. Acids that can be admixed with the hydrochloric acid include hydrofluoric acid, acetic acid, formic acid, sulfuric acid, phosphoric acid and mixtures thereof.

The inhibitor is a composition consisting of two essential ingredients: a reaction product and a source of antimony ions. The reaction product is the product of the reaction of (i) one equivalent of a compound having at least one reactive hydrogen atom and having no groups reactive under the conditions of reaction other than hydrogen comprising at least one member selected from the group consisting of amines, amides, aldehydes, nitrogen heterocycles, ketones, phenols and acetylenic alcohols and substituted derivatives thereof, (ii) from about 0.6 to about 10 equivalents of a carbonyl compound having at least one hydrogen atom on the carbon atom adjacent to the carbonyl group, (iii) from about 0.5 to about 10 equivalents of an aldehyde, (iv) from about 0.10 to about 10 equivalents of a fatty compound having from 5 to 60 carbon atoms or an alkyl nitrogen heterocycle having at least one alkyl group having from 1 to 18 carbon atoms and 3 to 9 carbon atoms in the heterocyclic ring structure or admixtures thereof, each of said reaction constituents (i) through (iv) being different compounds and (v) from about 0.8 to about 1.2 equivalents of a mineral acid catalyst, said reaction being conducted at a temperature of from about 140° F. to about 250° F. for a period of from about 4 to about 48 hours. The reaction product is admixed with a source of antimony ions which is capable of activation by the reaction product to cause a reduction in the corrosive effect upon a metal surface in contact with an aqueous acidic solution comprising hydrochloric acid containing said inhibitor.

The phrase "a source of antimony ions" as used herein and in the appended claims means and is limited to any antimony compound which is soluble in acid solutions comprising hydrochloric acid.

DESCRIPTION OF THE PREFERRED EMBODIMENT

In accordance with the present invention, there is provided an aqueous acidic solution comprising an aqueous fluid, an acid and a corrosion inhibitor containing an antimony compound.

The acid employed in the aqueous acidic solution of the present invention must comprise hydrochloric acid in an amount of at least about 2% by weight of the acidizing solution. The acid can comprise hydrochloric acid or mixtures of hydrochloric acid with hydrofluoric acid, acetic acid, formic acid or mixtures of these acids and the like.

The corrosion inhibitor is a composition consisting of a blend of a reaction product and an antimony compound. The reaction product is the product of the reaction of effective amounts of certain active hydrogen containing compounds with organic carbonyl compounds having at least one hydrogen atom on the carbon atom alpha to the carbonyl group and a fatty acid or other fatty compound or alkyl nitrogen heterocycles and preferably 2 or 4 alkyl substituted and an aldehyde, and particularly those aldehydes which may be selected from the group consisting of aliphatic aldehydes containing from 1 to 16 carbon and aromatic aldehydes having no functional groups which are reactive under the reaction conditions other than aldehydes. The above ingredients are reacted in the presence of an acid catalyst of sufficient strength to thereby form the reaction product. The antimony compound is an antimony compound that is capable of activation by the reaction product to yield an inhibitor which will effectively resist the attack on metal by aqueous hydrochloric acid solutions.

As shown by the Examples below, the reaction product by itself does reduce the corrosive effect of a hydrochloric acid solution on ferrous or other metals in contact with the acid solution. However, the antimony compound when blended with the reaction product achieves a substantial increase in corrosion reduction. The exact mechanism by which the reaction product and the antimony compound interact is not known.

In preparing the reaction product employed in the inhibitor of the present invention the active hydrogen compound containing at least one active hydrogen atom is reacted in the presence of an acid catalyst with a carbonyl compound having at least one hydrogen atom attached to the carbon atom alpha to the carbonyl group, an aldehyde, a fatty acid or other fatty material or alkyl nitrogen heterocycles at a temperature in the range of from about 140° F. to about 250° F. for a time in the range of from about 4 to about 48 hours. It is to be understood that the duration of the reaction may significantly exceed 48 hours without any adverse effects however such extensive periods are not required to yield usable products.

The active hydrogen compounds which can be employed in accordance with the present invention are those organic ammonia derivatives having at least one hydrogen atom attached to nitrogen, as for example, primary and secondary amines, diamines, amides, ureas, thioureas, ammonia and ammonium salts, alicyclic amines, heterocyclic amines, aromatic amines and the like which contain no group reactive under the conditions of the reaction other than hydrogen attached to nitrogen or fully substituted amines in which at least one hydrogen atom adjacent to the amine is activated by the presence of the amine or aldehydes, or ketones, or phenols or acetylenic alcohols as hereinafter described. Some of such compounds which have been found effective are the normal alkylamines having from 1 to 20 or more carbon atoms in the alkyl substituent, as for example, methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, nonaldecylamine, eicosylamine, and mixtures thereof. The isoalkyl and tertiaryalkylamines having up to 20 carbon atoms in the alkyl substituent such as for example, isopropylamine, isobutylamine, isoamylamine, and the like, tertiarybutylamine, tertiaryamylamine and the like; the dialkylamines having from 1 to 20 alkyl groups in the alkyl substituents such as dimethylamine, diethylamine, dipropylamine, dibutylamine, diamylamine, dihexylamine, diheptylamine, dioctylamine, didecylamine, dioctadecylamine and the like, as well as the diiso and tertiaryalkylamines, and mixtures thereof. The diamines which are useful as the active hydrogen compound include those diamines having from 1 to 20 carbon atoms in the alkyl portions thereof such as methylenediamine, ethylenediamine, propylenediamine, butylenediamine, diaminopentane (see pentylenediamine), diaminohexane (hexylenediamine) and the like. In addition other nitrogen containing compounds having an active hydrogen on the nitrogen atom such as ammonia, ureas, thioureas, amides, ammonium salts and alicyclic, heterocyclic and aromatic amines are operative as the active hydrogen compound in accordance with the present invention. Thus, one can employ ammonia, urea, thiourea, 1-acetyl-2-thiourea, 1,3-di-(Rosin Amine D) thiourea, 1,3-dibutylthiourea and the like, acetamide, N-1-napthylacetamide, oxamide, adipamide, propionamide, thioacetamide, malonamide, formamide, alpha-cyanoacetamide, succinimide, n-butyramide, dimethylacetamide, N-methyl-acetamide, n-butyramide, dimethylacetamide, N-methylacetamide, n-butyloxamate, hexanamide, phthalimide, n-valer-amide, isobutyramide, Armid 12 (95 percent dodecanamide, 4 percent tetradecanamide, 1 percent decanamide), N,N'-dibenzyldithiooxamide, dithiooxamide, Armid C (amide of coco fatty acids), 1-napthaleneacetamide, Armid O (91 percent oleamide, 6 percent stearylamide, 3 percent linolamide), N,N'-dimethylthiooxamide, acetanilide, Armid HT (75 percent stearylamide, 22 percent palmitamide, 3 percent oleamide), nonanamide, N,N'dicyclohexyldithiooxamide, benzamide, B-isothioureidopropionic acid, N,N'bis(hydroxy-methyl)-dithiooxamide, and the like, 2-methylpiperazine, morpholine, pyrrolidine, 2-aminoethylpiperazine, and the like, 2-naphthylamine, benzylamine, 2- aminopyridine, aniline and the like, 1,3-diphenyltriazene, and the like, ammonium chloride, monobasic ammonium phosphate, ammonium acetate, ammonium thiocyanate, ammonium oxalate, dibasic sodium ammonium phosphate and the like are effective sources of active hydrogen in accordance with the present invention. Fully substituted amines such as tetraethyl quaternary ammonium chloride and dimethyl dicoco quaternary ammonium chloride also may be utilized.

The carbonyl compounds which are operative in accordance with the present invention are those having at least one hydrogen atom on the carbon atom alpha to the carbonyl group. Some of such carbonyls found to be effective are the aliphatic and aryl substituted aliphatic ketones and mixtures thereof, as for example, acetophenone, mesityl oxide, 1-acetonaphthone, 1 part acetophenone plus 1 part acetone, p-methoxyacetophenone, propiophenone, p-chloroacetophenone, isophorone, tetrolophenone, 2,4-pentanedione, Ketosol (75 percent phenethyl alcohol, 25 percent acetophenone), 2-acetyl-cyclohexanone, 2-acetonaphthone, 2-thienylketone, methyl isobutylketone, n-butyrophenone, acetone, 3,4-dihydro-1-(2H)naphthalenone, 2-heptanone, diacetone alcohol, undecanone-2, and the like such as the aldehydes defined hereinafter.

The class of fatty compounds found to be operative include the alkyl carboxylic acids, amines, amides and alcohols having from about 5 to about 60 carbon atoms, the olefinic carboxylic acids having from about 5 to about 60 carbon atoms and having from 1 or more unsaturated sites along the chain. In addition the various alkylene oxide adducts of the above fatty compounds have been found effective. Thus one can employ rendered animal fat, octanoic acid, myristic acid, pelargonic acid, abietic acid, acetic acid, lauric acid, formic acid, oleic acid, caprylic acid, tall oil acid, coco fatty acids+15 moles ethylene oxide, oleic acid+15 moles ethylene oxide, 70 percent rosin fatty acids+15 moles ethylene oxide, tall oil+4 moles propylene oxide+8 moles ethylene oxide, tall oil+6 moles propylene oxide+12 moles ethylene oxide, tall oxide+4 moles propylene oxide+12 moles ethylene oxide, tall oil+4 moles propylene oxide+10 moles ethylene oxide, tall oil+6 moles propylene oxide+8 moles ethylene oxide, tall oil+6 moles propylene oxide+10 moles ethylene oxide, and the like. Further, alkyl aromatic nitrogen heterocycles are found to be operative. Thus, compounds such as 2-methyl pyridine, 4-methyl pyridine, 2-methyl quinoline, 4-methyl quinoline, alkyl pyridine and the like may be utilized.

The term "fatty" as used herein refers to the length of the carbon chain, which should consist of at least about 5 carbon atoms. The degree of saturation or unsaturation of the fatty compound is unimportant so long as any substituents present do not cause unwanted side reactions.

The class of aldehydes which are operative in accordance with the present invention include the aldehydes having from 1 to 16 or more carbon atoms. Thus one can employ formaldehyde, urotopine, benzaldehyde, heptanal, propanol, hexanal, octanal, decanal, hexadecanal, cinnamaldehyde and the like. The aldehydes also include any aldehyde generating materials under the conditions of the reaction such as paraformaldehyde, paraldehyde, acetals, hemiacetals, sulfite addition products and the like.

The mineral acid catalyst which is employed in preparing the reaction product can be, for example, hydrochloric acid, sulfuric acid, methanesulfonic acid, phosphoric acid and the like. The acid catalyst can comprise substantially any acid which is a strong proton donor. The specific quantity of acid utilized can vary over wide ranges. Any quantity can be utilized that does not result in the occurrence of undesirable side reactions under the reaction conditions.

Additional substituents which can be substituted for the various constituents of the reaction product are disclosed in U.S. Pat. Nos. 3,630,933; 3,932,296; 3,077,454; 2,758,970; 2,489,668; 4,493,775; 3,634,270; and 3,094,490 and European Patent Application numbers 0 276 879 A1 and 0 212 752 A1.

A preferred method of preparing the reaction product employed in the inhibitor composition of the present invention is to react about 1 equivalent of active hydrogen compound and from about 0.5 to about 10 equivalent of aldehyde and from about 0.6 to about 10 equivalents of carbonyl compound and from about 0.8 to about 1.2 equivalents of mineral acid catalyst with from about 0.15 to about 10 equivalents of fatty compound at a temperature in the range of from about 140° F. to about 240° F. for a time in the range of from about 4 to 48 about hours. Upon completion of the reaction, additional fatty material may be added with stirring to bring the ratio of fatty material to a level of from about 2 to about 20 equivalents. The term "equivalent" as used herein is defined as the number of moles of a compound that are present multiplied by the number of reactive sites on the compound under the conditions of the reaction.

The antimony compound can be blended directly with the reaction product or blended in the acidic solution.

The antimony compound employed in the corrosion inhibitor composition of the present invention can be any antimony compound which in the presence of the reaction product produces a reduction in the corrosive effect of the acid in the aqueous acidic solution on ferrous or other metals in contact with the acid solution by an amount greater than the reduction in corrosion produced by the reaction product when the antimony compound is not present. As shown by Example III below, the antimony compound by itself (the reaction product is not present) does not reduce the corrosive effect of the acid. As used herein and in the appended claims, an antimony compound that is "activated" or "capable of activation" by the reaction product is an antimony compound which when dissolved in the presence of the reaction product produces a greater reduction in the corrosive effect of the acid on ferrous or other metals in contact with the acid solution than the reduction in the corrosive effect produced by the reaction product by itself. The antimony compound therefor must be soluble in the aqueous acidic solution, at the conditions in which the aqueous acidic solution is used.

Examples of sources of antimony ions useful herein are antimony compounds which include but are not limited to antimony trioxide, antimony pentoxide, antimony trichloride, antimony pentachloride, potassium antimony tartrate and other alkali metal salts thereof, antimony tartrate, antimony trifluoride, antimony pentafluoride, antimony citrate, potassium pyroantimonate and other alkali metal salts thereof, antimony adducts of ethylene glycol, solutions containing (i) ethylene glycol, (ii) water and (iii) the oxidized product of hydrogen peroxide and antimony trioxide or any other trivalent antimony compound and the like.

The acetylenic alcohols which may be employed in the reaction to make the reaction product may suitably include substantially any of the acetylenic compounds having the general formula:

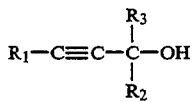

$$R_1-C\equiv C-\underset{\underset{R_2}{|}}{\overset{\overset{R_3}{|}}{C}}-OH$$

wherein $R_1$, $R_2$ and $R_3$ are hydrogen, alkyl, phenyl, substituted phenyl or hydroxyalkyl radicals. Preferably, $R_1$ comprises hydrogen. Preferably, $R_2$ comprises hydrogen, methyl, ethyl or propyl radicals. Preferably, $R_3$ comprises an alkyl radical having the general formula $C_nH_{2n}$ where n is an integer from 1 to 10. The acetylenic alcohols(s), in certain applications, further reduces the corrosive effect of the acid.

Some examples of acetylenic alcohols which can be employed in accordance with the present invention are, for example, methyl butynol, methyl pentynol, hexynol, ethyl octynol, propargyl alcohol, benzylbutynol, ethynylcyclohexanol and the like. Preferred alcohols are hexynol, methyl butynol and ethyl octynol.

The quaternary aromatic ammonium compounds which may be employed in the reaction to make the reaction product comprise aromatic nitrogen compounds which may be illustrated by alkyl pyridine-N-methyl chloride quaternary, alkyl pyridine-N-benzyl chloride quaternary, alkylquinoline-N-benzyl chloride quaternaries, alkylisoquinoline quaternaries, benzoquinoline quaternaries, chloromethylnaphthalene quaternaries of the above, admixtures of the compounds and the like. The alkyl group associated with the pyridine compounds can contain from 0 to 6 carbon atoms and with the quinoline compounds can contain from 0 to 8 carbon atoms. The quaternary ammonium compound(s) also function to reduce the corrosive effect of the acid in certain applications.

Additional additives which can be present in the corrosion inhibitor can comprise, for example, a solvent such as an alkanol to assist in maintaining the constituents of the corrosion inhibitor as a homogeneous admixture.

Alkanols which can be employed in the present invention are, for example, methyl, ethyl, propyl, isopropyl, butyl, pentyl, hexyl, heptyl, octyl and the higher liquid members of these aliphatic alcohols. Preferably, the quantity of alkanol employed is that which merely is sufficient to maintain the constituents in homogeneous admixture as excess quantities have no demonstrable effect on the effectiveness of the corrosion inhibitor. Preferably, the alkanol comprises less than about fifteen percent by volume of the corrosion inhibitor composition to avoid unnecessary dilution of the inhibitor composition.

The corrosion inhibitor also can include a surfactant which facilitates dispersion of the corrosion inhibitor in the aqueous acidic solution. Nonionic surfactants are preferred for use in the corrosion inhibitor.

The nonionic surfactant can comprise an ethoxylated oleate, tall oils or ethoxylated fatty acids. The 8 to 20 moles of ethylene oxide adducts of octyl phenol, nonylphenol, tridecyl phenol and the like are preferred. Sufficient nonionic surfactant is admixed with the other constituents of the corrosion inhibitor to facilitate dispersion of the corrosion inhibitor in the aqueous acidic solution. Preferably, the surfactant comprises less than about 20 percent by volume of the corrosion inhibitor composition to avoid unnecessary dilution of the inhibitor composition.

The reaction product comprises in the range of from about 3% to about 75% by weight of the corrosion inhibitor. More preferably, the reaction product comprises from about 35% to about 70% by weight of the corrosion inhibitor. The antimony compound may be present in the corrosion inhibitor in an amount sufficient to obtain a solution having a concentration of from about 0.0001 to about 0.1 molar in the aqueous acidic solution. Preferably, the antimony compound is present in an amount sufficient to provide a concentration in the aqueous acidic solution of from about 0.0007 to about 0.04 and most preferably of about 0.001 to about 0.04 molar. It is to be understood that larger quantities may be utilized but such use is generally unnecessary. Excessive amounts have no demonstrable effect except at highly elevated temperatures.

The method of the present invention can be carried out by blending the aqueous fluid with the acid to provide an acidic solution of a desired concentration. The corrosion inhibitor then is blended with the solution in an amount sufficient to substantially reduce the corrosion rate of the acid on metal surfaces in contact or to be contacted with the acid. The amount of corrosion inhibitor utilized in the practice of the present invention can vary over a substantial range. Preferably, the inhibitor composition is present in an amount of from about 1 to about 20 gallons per 1000 gallons of aqueous acidic solution. The quantity of corrosion inhibitor will depend upon the concentration of the acid employed and the temperature at which the acidic solution will contact the metal surfaces.

The aqueous acidic solution of the present invention can be prepared in any suitable tank equipped with suitable mixing means well known to individuals skilled in the art. The solution may be transferred either at a controlled rate directly into the well bore or into a convenient storage tank for injection down the well bore.

The aqueous acidic solution is introduced into the subterranean formation whereby either foreign material in the well bore or in the formation or formation materials are dissolved to thereby increase the permeability of the formation. The increased permeability permits better flow of hydrocarbon fluids through the formation and into its well bore. The pumping rate and pressure utilized will depend upon the characteristics of the formation and whether or not fracturing of the formation is desired. After the aqueous acidic solution has been injected, the well may be shut in and allowed to stand for a period of several hours or more depending on the type of acid employed and the formation treated. If there is pressure on the well, pressure then can be released and the spent or at least partially spent aqueous acidic solution, containing salts formed by the reaction of the acid, is permitted to flow back into the well bore and is pumped or flowed to the surface for appropriate disposal. The well then can be placed on production or used for other purposes.

In one preferred embodiment the reaction product is prepared by adding the following compounds to a reaction vessel on the basis of one mole of thiourea, 2 moles of acetophenone, 1.33 moles of oleic acid, 4.4 moles of formaldehyde and one mole of hydrochloric acid. The reactor contents are stirred to dissolve the thiourea and then heated under reflux conditions at a temperature of about 220° F. for about 16 hours. The reaction product is separated from the residue in the reactor vessel as a separated nonaqueous layer in the vessel, which forms upon cooling of the reaction mixture.

The following examples are illustrative of the present invention, but are not to be construed as limiting the scope thereof.

EXAMPLE I

The following ingredients are charged to a 250 ml. glass reaction flask equipped with a stirrer and reflux condenser.

| | |
|---|---|
| Thiourea | 0.15 moles |
| Acetophenone | 0.3 moles |
| 37% formaldehyde | 0.66 moles |
| Concentrated HCl | 0.15 moles |
| Oleic acid | 0.2 moles |

The materials may be added in any order to the reaction vessel. The charge is stirred and refluxed gently for about 16 hours while stirring. The product then is allowed to stand for about 0.5 hours during which time the temperature drops from about 220° to about 120° F. and an aqueous layer separates in the flask. The crude reaction product, an organic layer, is separated and stored.

An inhibitor blend was prepared by adding 4 ml of the reaction mixture to 4 ml of methylnaphthylquinolinium chloride solution and 1.5 ml of nonylphenol ethoxylated with about 20 moles of ethylene oxide unless otherwise designated. A solution of 100 ml of 15% hydrochloric acid was prepared to which was added 1 ml of the foregoing blend and in some instances antimony was added to the solution to provide a concentration of about 0.018 moles/liter. The source of antimony was the reaction product of antimony trioxide and hydrogen peroxide in ethylene glycol and water.

The corrosion loss determination in lb/ft$^2$ then was made as follows: a coupon was cut from API N 80 steel oil field tubing and the surface area was determined. The coupon was weighed and placed in the acidic solution containing the inhibitor. The solution and coupon then was placed in an autoclave which was placed in a heating jacket preset to provide an autoclave temperature of about 300° F. and exposed for 2 hours.

At the end of this time the coupon was removed, weighed and the corrosion loss calculated from the weight lost. To evaluate the scope of available substituents for use in the various method of the present invention, various compounds were substituted for the constituents in the inhibitor reaction mixture. The substitutions were made on a molar basis except as noted in the Tables.

TABLE I

Substitutes for Mineral Acid in Reaction Mixture

| | Corrosion Loss, lb/ft$^2$ | |
|---|---|---|
| | Reaction Product of Present Invention | |
| Compound | Without Antimony | With Antimony |
| Hydrochloric Acid | 0.053 | 0.005 |
| Sulfuric Acid | 0.040 | 0.006 |
| Phosphoric Acid | 0.037 | 0.004 |
| Methanesulfonic Acid | 0.089 | 0.009 |
| Formic Acid | — | 0.627 |

TABLE I-continued

Substitutes for Mineral Acid in Reaction Mixture

| | Corrosion Loss, lb/ft$^2$ | |
|---|---|---|
| | Reaction Product of Present Invention | |
| Compound | Without Antimony | With Antimony |
| Acetic Acid | — | 0.337 |

The corrosion loss for a blank coupon without any inhibitor present is about 0.733 lb/ft$^2$

TABLE II

Substitutes for Fatty Acid in Reaction Mixture

| | Corrosion Loss, lb/ft$^2$ | |
|---|---|---|
| | Reaction Product of Present Invention | |
| Compound | Without Antimony | With Antimony |
| Oleic Acid | 0.053 | 0.005 |
| Ethomeen C[1] | — | 0.004 |
| NEOFAT 8S[2] | — | 0.003 |
| Actinol | 0.044 | 0.004 |
| Ethomid 0-17[3] | 0.043 | 0.006 |
| Arimd O[4] | — | 0.006 |
| 2-Picoline | — | 0.004 |
| Oleyl alcohol | 0.098 | 0.006 |
| Xylene | — | 0.193 |
| Pine oil | 0.063 | 0.101 |
| Pyridine | — | 0.258 |

[1]Cocoamine sold by Akzo Chemie America
[2]Commercially pure caprylic acid sold by Akzo Chemie America
[3]7 moles of Ethylene oxide on Armid O sold by Akzo Chemie America
[4]Octadecenylamide sold by Akzo Chemie America

TABLE III

Substitutes for Active Hydrogen Containing Compound in Reaction Mixture

| | Corrosion Loss, lb/ft$^2$ | |
|---|---|---|
| | Reaction Product of Present Invention | |
| Compound (moles)[1] | Without Antimony | With Antimony |
| Thiourea | 0.053 | 0.005 |
| Urea | — | 0.002 |
| Guanidine carbonate | 0.153 | 0.004 |
| Acetamide (0.3) | 0.140 | 0.089 |
| Ammonium chloride | — | 0.004 |
| 2-picoline (0.3) | 0.119 | 0.007 |
| Quinaldine (0.3) | 0.216 | 0.003 |
| Phenol (0.3) | 0.313 | 0.004 |
| Morpholine (0.3) | 0.141 | 0.005 |
| Hexahydropyrimidine-2-thione | 0.132 | 0.005 |
| Dibutyl amine (0.3) | 0.274 | 0.006 |
| Cocoamine (0.3) | 0.305 | 0.006 |
| 2,6-lutidine (0.3) | 0.722 | 0.012 |
| Butylamine | — | 0.011 |
| Dicocoamine (0.3) | — | 0.011 |
| Oleamide (0.3) | 0.231 | 0.011 |
| Tributylamine (0.6) | 0.750 | 0.012 |
| Tetraethylammonium chloride | 0.141 | 0.011 |
| 4-picoline (0.6) | 0.718 | 0.010 |
| Quinoline (0.6) | 0.805 | 0.016 |
| Butanal (0.3) | 0.816 | 0.008 |
| Heptanal (0.3) | 0.516 | 0.011 |
| Methylnonylketone (0.3) | 0.726 | 0.012 |
| Formamide (0.3) | 0.180 | 0.140 |
| Rubeanic acid | 0.040 | 0.132 |
| Pyridine (0.3) | 0.671 | 0.215 |
| 2-hydroxy-1,4-Xylene (0.3) | — | 0.233 |
| Hexahydropyrimidine-2-thione (0.3) | — | 0.068 |
| Butylamine (0.3) | — | 0.231 |
| Tributylamine (0.3) | — | 0.267 |
| Quinoline still residues (0.3) | — | 0.220 |
| Quinoline (0.3) | — | 0.662 |
| Diethylamine (0.3) | — | 0.424 |
| Ethanolamine (0.3) | — | 0.738 |
| 2,6 lutidine | — | 0.526 |

TABLE III-continued

Substitutes for Active Hydrogen Containing Compound in Reaction Mixture

| Compound (moles)[1] | Corrosion Loss, lb/ft[2] Reaction Product of Present Invention | |
|---|---|---|
| | Without Antimony | With Antimony |
| Acrolein (0.3) | — | 0.547 |
| 3-picoline (0.3) | — | 0.665 |
| Pyridine (0.6) chloride | — | 0.745 |
| Acrolein (0.6) | — | 0.702 |

[1]molar ratio described in Example I are utilized unless otherwise specified
[2]Failure of this compound is believed to be due to lack of solubility of the compound in the reaction media.

TABLE IV

Substitutes for Ketone in Reaction Mixture Reaction Mixture

| Compound (moles)[1] | Corrosion Loss, lb/ft[2] Reaction Product of Present Invention | |
|---|---|---|
| | Without Antimony | With Antimony |
| Acetophenone | 0.053 | 0.005 |
| 2-butanone | — | 0.006 |
| Cyclohexanone | 0.055 | 0.012 |
| 2,4 pentanedione | 0.253 | 0.006 |
| Undecone | 0.053 | 0.004 |
| Formylpiperdine | 0.113 | 0.006 |
| Ethomide 0-17[1] | 0.043 | 0.006 |
| Heptanal | 0.053 | 0.004 |
| Levulenic acid | 0.205 | 0.006 |
| Hexynol | 0.107 | 0.007 |
| Ethyl octynol | 0.037 | 0.008 |
| 4-picoline | 0.034 | 0.007 |
| Butanal | 0.207 | 0.007 |
| 2-picoline | 0.204 | 0.005 |
| Dibutylamine | 0.070 | 0.007 |
| Trihexylamine (0.6) | 0.136 | 0.007 |
| Dimethyldicocoamine (0.3) | 0.074 | 0.005 |
| Formamide (0.3) | 0.730 | 0.583 |
| Tripropylamine (0.3) | 0.662 | 0.255 |
| Tripropylamine (0.6) | 0.698 | 0.161 |
| Quinaldine (0.3) | 0.709 | 0.363 |
| Quinoline (0.3) | 0.741 | 0.278 |

[1]7 moles of ethylene oxide on Armid O sold by Akzo Chemie America

TABLE V

Substitutes for Formaldehyde in Reaction Mixture

| Compound | Corrosion Loss, lb/ft[2] Reaction Product of Present Invention | |
|---|---|---|
| | Without Antimony | With Antimony |
| Formaldehyde | 0.053 | 0.005 |
| Propanal | 0.204 | 0.003 |
| Butanal | 0.828 | 0.004 |
| Heptanal | 0.674 | 0.003 |
| Formaldehyde-bisulfite | 0.042 | 0.006 |
| Paraformaldehyde | 0.103 | 0.007 |
| Benzaldehyde | 0.064 | 0.005 |

The foregoing data clearly illustrate the substantially improved corrosion reduction achieved through use of the composition of the present invention containing antimony. The data also illustrates the operability of the various described classes of substitutes for the various compounds in the composition.

EXAMPLE II

To illustrate the utility of antimony in the various forms in which it is available, the following tests were performed. The corrosion loss determination was made in the same manner as Example I and the reaction product of Example I was utilized in formulating the inhibitor blend as described therein. A solution of 100 ml of 15% hydrochloric acid was prepared to which was added 1 ml. of the foregoing blend and 1.8 millimoles of antimony ion provided by an antimony compound as set forth hereinafter. The acid was heated to 300° F. and a coupon of API N 80 steel was exposed for 2 hours to the heated acid in the manner described in Example I. The results are set forth in Table VI, below. A blank test was performed for comparison purposes in which no antimony compound was added to the reaction product of Example I admixed with the acid solution.

TABLE VI

| Antimony Source | Oxidation State | Corrosion loss, lb/ft[2] |
|---|---|---|
| None | — | 0.053 |
| Potassium antimony tartrate | III | 0.004 |
| Antimony trioxide | III | 0.004 |
| Antimony trifluoride | III | 0.002 |
| Antimony pentafluoride | V | 0.005 |
| Potassium pyroantimonate | V | 0.007 |
| Antimony trichloride | III | 0.004 |
| Antimony pentachloride | V | 0.004 |
| Solution containing ethylene glycol, water & the oxidized product of hydrogen peroxide & antimony trioxide | V | 0.004 |

The data clearly illustrates the increase in corrosion reduction achieved in the corrosion inhibitor blend upon incorporation of an antimony compound which is activated by the reaction product.

EXAMPLE III

Additional tests were performed to show that antimony alone in a hydrochloric acid solution does not reduce the corrosive effects of the acid on metal surfaces. Corrosion losses experienced by metal coupons placed in hydrochloric acid solutions, with and without antimony present, were determined. The corrosion loss determinations were made in the manner described in Example I.

In each test, a premeasured and preweighed coupon of API N 80 steel oil field tubing was placed in approximately 100 ml of a 15% hydrochloric acid solution. In the tests in which antimony was employed, a solution containing ethylene glycol, water and the oxidized product of hydrogen peroxide and antimony trioxide was added to the acid solution to provide a concentration of antimony in the solution of 0.018 moles/liter. The acid solution and coupon were then placed in an autoclave which was placed in a heating jacket preset to provide an autoclave temperature of about either 150°F., 200° F. or 300°F., and the acid solution and coupon were exposed to one of the above temperatures for two hours. At the end of the two hour period, the coupon was removed and weighed, and the corrosion loss was calculated from the weight lost.

The results of these tests are set forth in Table VII below.

TABLE VII

| Autoclave Temperature °F. | Corrosion Loss (lb/ft[2]) | |
|---|---|---|
| | 15% HCl | 15% HCl with 0.018 moles/liter antimony |
| 150 | 0.069 | 0.112 |
| 200 | 0.330 | 0.381 |

TABLE VII-continued

| Autoclave Temperature °F. | Corrosion Loss (lb/ft$^2$) | |
|---|---|---|
| | 15% HCl | 15% HCl with 0.018 moles/liter antimony |
| 300 | —* | 0.779 |

*As indicated in Example I, the corrosion loss for a blank coupon without any inhibitor present is about 0.733 lb/ft$^2$ when placed in 15% HCl for 2 hours at 300° F.

The results shown in Table VII clearly demonstrate that the presence of antimony in the solution did not reduce the corrosive effects of the 15% hydrochloric acid on the metal coupons at any of the various temperatures. As shown by reference to the data in Table VII and Table I of Example I, a significant difference with respect to corrosion inhibition upon a metal surface is shown by a 15% hydrochloric solution containing antimony alone, the reaction product of the present invention without antimony, and the reaction product when combined with antimony, which difference is clearly not merely an additive effect.

EXAMPLE IV

Further tests were carried out to illustrate the effectiveness of the inventive corrosion inhibitor when an acetylenic alcohol, quaternary ammonium compound and/or aromatic hydrocarbon having high oil wetting characteristics are employed therewith. In addition, tests were carried out to compare the effectiveness of the inventive corrosion inhibitor with the effectiveness of a prior art corrosion inhibitor that utilizes a blend—not a reaction product—of an acetylenic alcohol, a quaternary ammonium compound and an aromatic hydrocarbon together with antimony. The prior art blend tested is described in U.S. Pat. No. 4,498,997 to Walker.

The reaction product described in Example I was utilized in forming the inventive corrosion inhibitor used in the tests. An inhibitor blend was prepared by adding to the reaction product a quantity of nonylphenol ethoxylated with about 20 moles of ethylene oxide dispersing agent. A solution of 100 ml of 15% hydrochloric acid was prepared to which was added 1.0 ml of the foregoing blend.

The acetylenic alcohol employed in the tests was propargyl alcohol. The quaternary ammonium compound utilized was benzylquinolinium chloride. The aromatic hydrocarbon having high oil wetting characteristics was heavy aromatic naphtha.

The prior art corrosion inhibitor tested was prepared by blending propargyl alcohol, benzylquinolinium chloride, heavy aromatic naphtha and nonylphenol ethoxylated with about 20 moles of ethylene oxide dispersing agent to form an inhibitor blend. A solution of 100 ml of 15% hydrochloric acid was prepared to which was added 1.0 ml of the inhibitor blend.

Tests were conducted with and without antimony. In the tests employing antimony, a solution containing ethylene glycol, water and the oxidized product of hydrogen peroxide and antimony trioxide was added to the acid solution in an amount sufficient to supply 1.8 millimoles of antimony thereto.

Corrosion loss tests were carried out in the manner described in Example I. In each test, a premeasured and preweighed coupon of API N 80 steel oil field tubing was placed in the acid solution containing the inhibitor. The solution and coupon were then placed in an autoclave which was placed in a heating jacket preset to provide an autoclave temperature of about 300°F., and the solution and coupon were exposed at that temperature for 2 hours. At the end of the 2 hour period, the coupon was removed and weighed, and the corrosion loss was calculated from the weight lost.

The results of these tests are shown by Table VIII below:

TABLE VIII

| | (mls) | | | | | Corrosion Loss (lb/ft$^2$) | |
|---|---|---|---|---|---|---|---|
| Run No. | RP$^1$ | Dispers. Agent$^2$ | Acet. OH | Quat. Amm. Cmpd.$^3$ | Aromatic H/C$^4$ | Column A Antimony Not Present | Column B Antimony 1.8 Millimoles |
| 1 | 8 | 2 | — | — | — | 0.207 | 0.006 |
| 2 | 5 | 2 | 5$^5$ | — | — | 0.043 | 0.006 |
| 3 | 5 | 2 | — | 5 | — | 0.050 | 0.005 |
| 4 | 5 | 2 | — | — | 5 | 0.185 | 0.008 |
| 5 | 4 | 1 | 2$^5$ | 3 | 5 | 0.032 | 0.005 |
| 6 | 4 | 2 | —* | 3 | 3 | 0.129 | 0.006 |
| 7 | 0 | 2 | 4$^5$ | 3 | 3 | 0.015 | 0.006 |

$^1$Reaction product.
$^2$Nonylphenol ethoxylated with about 20 moles ethylene oxide.
$^3$Benzylquinolinium chloride.
$^4$Aromatic naphtha.
$^5$Propargyl alcohol.
*2 ml Isopropyl alcohol was used as a solvent to prevent separation of the component The results of the above tests (Runs 2–6) show that various blends of an acetylenic alcohol, a quaternary ammonium compound and an aromatic hydrocarbon having high oil wetting characteristics with the reaction product do not decrease and, in fact, improve the protection against corrosion achieved by the reaction product (Run 1) in the absence of antimony (Column A). The results also show that the reaction product (Run 1) in the absence of antimony (Col. A) was not as effective as a prior art blend (Run 7) in the absence of antimony (Col. A). in reducing corrosion by the acid.

Column A of Table VIII shows the corrosion results obtained with various inhibitors in the absence of antimony. It will be noted that the most satisfactory results were obtained in Run 7, a prior art blend of chemicals, and that the least satisfactory results were obtained in Run 1 which is the reaction product by itself, such as described in Monroe, et al.

Column B of Table VIII shows corrosion results obtained with various inhibitors in the presence of antimony. It will be noted that the results obtained with antimony in each of Runs 1–7 are considered to be identical within experimental error. In every case, the presence of antimony substantially improved the corrosion protection obtained by each inhibitor.

Run 7(B) is an example of a prior art corrosion inhibitor blend (Walker, et al.). Run 2(B) is a blend of reaction product and acetylenic alcohol having antimony added thereto. Run 1(B) is one example of the broad corrosion inhibitor of this invention. In view of the results obtained in Runs 1(A), 2(A) and 7(A), the results obtained in Runs 1(B), 2(B) and 7(B) are indeed surprising and unexpected.

From Table VIII, Runs 1B–6B, it is evident that the presence of antimony together with the reaction product is the critical combination notwithstanding the presence or absence of any other ingredient.

Thus, the blend of the reaction product with a source of antimony ions capable of being activated by the reaction product very effectively reduces the corrosive effects of a hydrochloric acid solution in contact with metal surfaces, even at high temperatures.

Example I clearly demonstrates the improvement in protection provided by the blend of antimony and the broad classes of substitutes for the components forming the reaction product. Example II demonstrates the utility of antimony in the various forms in which it is available. Example III shows that antimony alone does not reduce the corrosive effect of the acid further supporting the synergistic relationship between the reaction product and the antimony. Example IV shows that an acetylenic alcohol, quaternary ammonium compound and aromatic hydrocarbon having high oil wetting characteristics and mixtures thereof do not improve and do not reduce the corrosion reduction produced by the corrosion inhibitor of this invention. Finally, Example IV also shows that the inventive corrosion inhibitor of this invention is just as effective as the prior art corrosion inhibitor disclosed in U.S. Pat. No. 4,498,997 in reducing corrosion by the acid.

While particular embodiments of the invention have been described, it is to be understood that such descriptions are presented for purposes of illustration only and that the invention is not limited thereto and that reasonable variations and modifications, which will be apparent to those skilled in the art, can be made without departing from the spirit or scope of the invention as set forth in the appended claims:

What is claimed is:

1. A corrosion inhibitor which does not contain an acetylenic alcohol and which is useful to cause a reduction in the corrosion of a metal surface in contact with an aqueous acidic solution comprising hydrochloric acid, said corrosion inhibitor consisting of a blend of a source of antimony ions and a reaction product, said reaction product being prepared by reacting at least four reaction constituents together in the presence of from about 0.8 to about 1.2 equivalents of an aqueous mineral acid catalyst at a temperature in the range of from about 140° F. to about 250° F. for a time in the range of from about 4 hours to about 48 hours to thereby yield said reaction product;

wherein at least one of said four reaction constituents is one equivalent of a group (i) compound, at least one of said four reaction constituents is from about 0.6 to about 10 equivalents of a group (ii) compound, at least one of said four reaction constituents is from about 0.5 to about 10 equivalents of a group (iii) compound and at least one of said four reaction constituents is from about 0.10 to about 10 equivalents of a group (iv) compound and further wherein each of said reaction constituents are from different compounds;

said group (i) compounds have at least one reactive hydrogen atom and have no groups reactive under the conditions of reaction other than hydrogen and include compounds selected from the group consisting of amines, amides, aldehydes, nitrogen heterocycles, ketones, phenols, and acetylenic alcohols thereof;

said group (ii) compounds include a carbonyl group and have at least one hydrogen atom on the carbon atom adjacent to the carbonyl group; said group (iii) compounds are aldehydes, and said group (iv) compounds are selected from a fatty compound having from 5 to 60 carbon atoms, an alkyl nitrogen heterocycle having at least one alkyl group having from 1 to 18 carbon atoms and 3 to 9 carbon atoms in the heterocyclic ring structure and admixtures thereof.

2. The corrosion inhibitor of claim 1 wherein said source of antimony ions capable of activation by said reaction product is selected from the group consisting of antimony trioxide, pentoxide, trichloride, pentachloride, trifluoride, pentafluoride, tartrate, citrate, alkali metal salts of antimony tartrate or citrate, alkali metal salts of pyroantimonate, antimony adducts of ethylene glycol and solutions containing (i) ethylene glycol, (ii) water and (iii) the product of hydrogen peroxide and a source of trivalent antimony ions.

3. The corrosion inhibitor of claim 1 wherein said antimony ion is present in said inhibitor in an amount in the range of from about 0.0001 to about 0.1 molar with respect to an acid solution comprising hydrochloric acid.

4. The corrosion inhibitor of claim 3 wherein said group (i) compounds have at least one reactive hydrogen atom attached to nitrogen and have no groups reactive under the conditions of reaction other than said hydrogen atom attached to nitrogen and include compounds selected from the group consisting of amines, amides, and nitrogen heterocycles, thereof.

5. The corrosion inhibitor of claim 4 wherein said group (i) compound is thiourea, said group (ii) compound is acetophenone, said group (iii) compound is formaldehyde, said group (iv) compound is oleic acid and said aqueous mineral acid is hydrochloric acid.

6. The corrosion inhibitor of claim 5 wherein said source of antimony ions is a solution containing ethylene glycol, water and the oxidized product of hydrogen peroxide and antimony trioxide.

7. An aqueous acidic solution comprising hydrochloric acid and said corrosion inhibitor of claim 3.

8. The acidic solution of claim 5 wherein said corrosion inhibitor is present in said solution in an amount in the range of from about 1 to about 20 gallons inhibitor per 1000 gallons of aqueous acidic solution.

9. The corrosion inhibitor of claim 3 wherein said group (i) compounds have at least one reactive hydrogen atom and have no groups reactive under the conditions of reaction other than hydrogen and include compounds selected from the group consisting of aldehydes, ketones, phenols, and acetylenic alcohols.

10. The corrosion inhibitor of claim 9 wherein said group (i) compound is selected from the group consisting of phenol, butanal, heptanal, methylnonylketone and ethyl octynol, said group (ii) compound is acetophenone, said group (iii) compound is formaldehyde, said group (iv) compound is oleic acid and said aqueous mineral acid is hydrochloric acid.

11. The corrosion inhibitor of claim 10 wherein said source of antimony ions is a solution containing ethylene glycol, water and the oxidized product of hydrogen peroxide and antimony trioxide.

12. A method of acidizing a subterranean formation penetrated by a well bore whereby the corrosive effect of an acidic solution on metal present in said well bore is minimized, said method comprising contacting said formation with an aqueous acidic solution comprising hydrochloric acid which contains a corrosion-reducing effective amount of a corrosion inhibitor which does not contain an acetylenic alcohol, said corrosion inhibitor consisting of a blend of a source of antimony ions and a reaction product, said reaction product being prepared by reacting at least four reaction constituents together in the presence of from about 0.8 to about 1.2 equivalents of an aqueous mineral acid catalyst at a temperature in the range of from about 140° F. to about 250° F. for a time in the range of from about 4 hours to about 48 hours to thereby yield said reaction product;

wherein at least one of said four reaction constituents is one equivalent of a group (i) compound, at least one of said four reaction constituents is from about 0.6 to about 10 equivalents of a group (ii) compound, at least one of said four reaction constituents is from about 0.5 to about 10 equivalents of a group (iii) compound and at least one of said four reaction constituents is from about 0.10 to about 10 equivalents of a group (iv) compound and further wherein each of said reaction constituents are from different compounds;

said group (i) compounds have at least one reactive hydrogen atom and have no groups reactive under the conditions of reaction other than hydrogen and include compounds selected from the group consisting of amines, amides, aldehydes, nitrogen heterocycles, ketones, phenols, and acetylenic alcohols;

said group (ii) compounds include a carbonyl group and have at least one hydrogen atom on the carbon atom adjacent to the carbonyl group;

said group (iii) compounds are aldehydes, and said group (iv) compounds are selected from a fatty compound having from 5 to 60 carbon atoms, an alkyl nitrogen heterocycle having at least one alkyl group having from 1 to 18 carbon atoms and 3 to 9 carbon atoms in the heterocyclic ring structure and admixtures thereof.

13. The method of claim 12 wherein said source of antimony ions capable of activation by said reaction product is selected from the group consisting of antimony trioxide, pentoxide, trichloride, pentachloride, trifluoride, pentafluoride, tartrate, citrate, alkali metal salts of antimony tartrate or citrate, alkali metal salts of pyroantimonate, antimony adducts of ethylene glycol and solutions containing (i) ethylene glycol, (ii) water and (iii) the product of hydrogen peroxide and a source of trivalent antimony ions.

14. The method of claim 12 wherein said antimony ion is present in said inhibitor in an amount in the range of from about 0.0001 to about 0.1 molar with respect to said hydrochloric acid solution.

15. The method of claim 14 wherein said group (i) compounds have at least one reactive hydrogen atom attached to nitrogen and have no groups reactive under the conditions of reaction other than said hydrogen atom attached to nitrogen and include compounds selected from the group consisting of amines, amides, and nitrogen heterocycles.

16. The method of claim 15 wherein said group (i) compound is thiourea, said group (ii) compound is acetophenone, said group (iii) compound is formaldehyde, said group (iv) compound is oleic acid and said aqueous mineral acid is hydrochloric acid.

17. The method of claim 16 wherein said source of antimony ions is a solution containing ethylene glycol, water and the oxidized product of hydrogen peroxide and antimony trioxide.

18. The method of claim 17 wherein said corrosion inhibitor is present in said solution in an amount in the range of from about 1 to about 20 gallons inhibitor per 1000 gallons of aqueous acidic solution.

19. The method of claim 15 wherein said group (i) compound is selected from the group consisting of urea, guanidine carbonate, ammonium chloride, 2-picoline, quinaldine, morpholine, dibutylamine, butylamine, oleamide, tetraethylammonium chloride, 4-picoline, quinoline, cocoamine, dicocoamine and hexahydropyrimidine-2-thione, said group (ii) compound is acetophenone, said group (iii) compound is formaldehyde, said group (iv) compound is oleic acid and said aqueous mineral acid is hydrochloric acid.

20. The method of claim 19 wherein said source of antimony ions is a solution containing ethylene glycol, water and the oxidized product of hydrogen peroxide and antimony trioxide.

21. The method of claim 20 wherein said corrosion inhibitor is present in said solution in an amount in the range of from about 1 to about 20 gallons inhibitor per 1000 gallons of aqueous acidic solution.

* * * * *